(12) United States Patent
Noguchi

(10) Patent No.: US 8,927,934 B2
(45) Date of Patent: Jan. 6, 2015

(54) THERMAL INFRARED SENSOR AND MANUFACTURING METHOD THEREOF

(75) Inventor: Hidetaka Noguchi, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 183 days.

(21) Appl. No.: 13/227,681

(22) Filed: Sep. 8, 2011

(65) Prior Publication Data

US 2012/0061569 A1 Mar. 15, 2012

(30) Foreign Application Priority Data

Sep. 13, 2010 (JP) ................. 2010-204413

(51) Int. Cl.
*G01J 5/00* (2006.01)
*G01J 5/08* (2006.01)
*G01J 5/02* (2006.01)

(52) U.S. Cl.
CPC ............... *G01J 5/0881* (2013.01); *G01J 5/024* (2013.01); *G01J 5/0853* (2013.01)
USPC ..................................................... 250/338.3

(58) Field of Classification Search
USPC ............. 250/338.3, 330, 332, 339.01–339.02
See application file for complete search history.

(56) References Cited

U.S. PATENT DOCUMENTS

| | | | | |
|---|---|---|---|---|
| 6,034,374 | A * | 3/2000 | Kimura et al. ........... | 250/370.08 |
| 6,040,577 | A * | 3/2000 | Mauduit ................... | 250/338.1 |
| 6,495,829 | B1 * | 12/2002 | Oda ......................... | 250/339.02 |
| 6,552,344 | B1 * | 4/2003 | Sone et al. ................ | 250/338.1 |
| 6,599,771 | B2 * | 7/2003 | Mashio et al. ............ | 438/57 |
| 6,635,495 | B2 * | 10/2003 | Hashimoto et al. ...... | 438/3 |
| 6,674,081 | B2 * | 1/2004 | Hashimoto et al. ...... | 250/338.2 |
| 7,842,922 | B2 * | 11/2010 | Leneke et al. ............ | 250/338.1 |
| 7,964,433 | B2 * | 6/2011 | Bae et al. .................. | 438/72 |
| 2004/0129882 | A1 * | 7/2004 | Mashio et al. ............ | 250/338.1 |
| 2006/0124831 | A1 * | 6/2006 | Schimert et al. .......... | 250/214 R |
| 2007/0120058 | A1 * | 5/2007 | Blackwell et al. ........ | 250/338.1 |
| 2007/0170363 | A1 * | 7/2007 | Schimert et al. .......... | 250/353 |
| 2007/0262407 | A1 * | 11/2007 | Schimert et al. .......... | 257/432 |
| 2008/0217539 | A1 * | 9/2008 | Talghader ................ | 250/340 |
| 2008/0231946 | A1 * | 9/2008 | Scott et al. ............... | 359/350 |
| 2009/0197777 | A1 * | 8/2009 | Chagovetz et al. ....... | 506/15 |
| 2011/0266445 | A1 * | 11/2011 | Beratan ..................... | 250/338.4 |
| 2012/0049242 | A1 * | 3/2012 | Atanackovic et al. ..... | 257/184 |

FOREIGN PATENT DOCUMENTS

| | | |
|---|---|---|
| JP | 10-288550 | 10/1998 |
| JP | 2011-33393 | 2/2011 |

OTHER PUBLICATIONS

Authors: Gabriel Biener, Avi Niv, Vladimir Kleiner, and Erez Hasman. Title: Metallic subwavelength structures for a broadband infrared absorption control, Date Apr. 15, 2007, Publishe/Editionr: Optics Letters / vol. 32, No. 8 /.*

(Continued)

*Primary Examiner* — David Porta
*Assistant Examiner* — Taeho Jo
(74) *Attorney, Agent, or Firm* — Cooper & Dunham LLP

(57) ABSTRACT

A thermal infrared sensor includes an infrared ray absorbing film that is thermally separated from a semiconductor substrate by a hollow part; and a temperature sensor configured to detect temperature changes of the infrared ray absorbing film. The infrared ray absorbing film includes an infrared ray antireflection structure configured with a sub wavelength structure, the infrared ray antireflection structure being provided on a surface of the infrared ray absorbing film facing the semiconductor substrate.

9 Claims, 12 Drawing Sheets

(56) References Cited

OTHER PUBLICATIONS

Authors: Y. Kanamoria, K. Hane, H. Sai and H. Yugami, Title: 100 nm period silicon antireflection structures fabricated using a porous alumina membrane mask, Date: Jan. 8, 2001, Publisher/Volume: Applied Physics Letters vol. 78, No. 2.*

Authors: Douglas S. Hobbs and Bruce D. MacLeod, Title: Design, Fabrication, and Measured Performance of Anti-Reflecting Surface Textures in Infrared Transmitting Materials, Date: Mar. 29, 2005, Publisher/Volume: SPIE 5786-40.*

Authors Yung-Pin Chen, Hsin-Chieh Chiu, Guan-Yu Chen, Chieh-Hsiu Chiang, Ching-Tung Tseng, Chih-Hsien Lee, Lon A. Wang, Title: Fabrication and measurement of large-area sub-wavelength structures with broadband and wide-angle antireflection effect, Date: Dec. 23, 2009, Publisher/Volume: Microelectronic Engineering 87.*

Grann, Eric B., et al. (1995), "Optimal design for antireflective tapered two-dimensional subwavelength grating structures," Journal of Optical Society of America, A, vol. 12, No. 2, pp. 333-339.

Ohta, Yoshimi (2009), "Fabrication of a far-infrared sensor with a subwavelength structured absorber," 26th "Sensor micromachine and applied system" symposium paper collection, pp. 622-626 (with English abstract thereof).

* cited by examiner

THERMAL INFRARED SENSOR AND MANUFACTURING METHOD THEREOF

BACKGROUND OF THE INVENTION

1. Field of the Invention

The present invention relates to a thermal infrared sensor and a manufacturing method thereof, and more particularly to a thermal infrared sensor and a manufacturing method thereof for receiving infrared rays from the back surface of a substrate.

2. Description of the Related Art

There is a technology for increasing the sensitivity of a thermal infrared sensor such as a thermal infrared image sensor. Specifically, a bridge structure is formed by removing part of the substrate around the infrared ray absorbing film by etching to thermally separate the infrared ray absorbing film and the substrate. There is known a thermal infrared sensor configured to receive infrared rays at the back surface (substrate side) of the infrared ray absorbing film that is supported in a thermally insulated manner.

For example, patent document 1 discloses a thermal infrared sensor in which an infrared ray absorbing film, a temperature sensor, and wiring used for reading signals are formed on a micro-bridge structure that is thermally separated from the substrate. This thermal infrared sensor is configured to receive infrared rays from the back surface of the substrate. Furthermore, the thermal infrared sensor includes antireflection films provided on both sides of the substrate, for the purpose of preventing reflection of the infrared rays entering from the back surface of the substrate.

FIG. 15 is a schematic cross-sectional view of an example of a conventional thermal infrared sensor.

A sensor part 101 supported by beam parts 102 is facing a substrate 103 across a hollow space 104. Thus, the sensor part 101 is thermally separated from the substrate 103, so that the sensitivity of the thermal infrared sensor is increased. The sensor part 101 includes an infrared ray absorbing film 105 and a temperature sensor 106. In this thermal infrared sensor, infrared rays enter from the back surface of the substrate 103, and the infrared ray absorbing film 105 is facing the substrate 103. This thermal infrared sensor detects infrared rays as the temperature sensor 106 captures temperature changes that occur when infrared rays entering from the substrate 103 are absorbed at the infrared ray absorbing film 105. In order to extract signals from the temperature sensor 106 from outside, wirings 107 are formed in the sensor part 101 and the beam parts 102.

Furthermore, there is a technology for increasing the sensitivity of a thermal infrared sensor that receives infrared rays at the front surface of a substrate. Specifically, an antireflection structure is formed by a sub wavelength structure to mitigate the reflection of infrared rays (see, for example, non-patent document 1).

Patent Document 1: Japanese Laid-Open Patent Publication No. H10-288550

Non-patent Document 1: 26th "Sensor micromachine and applied system" symposium paper collection, pp. 622-626, 2009

However, in a thermal infrared sensor that receives infrared rays from the back surface of a substrate, an antireflection structure or an antireflection film is not formed on the surface of the infrared ray absorbing film that is thermally separated from the substrate (the surface facing the substrate). Thus, some of the infrared rays entering from the back surface of the infrared ray absorbing film are reflected, and the sensor sensitivity is degraded.

For example, in the thermal infrared sensor illustrated in FIG. 15, when infrared rays enter from the back surface of the substrate 103, reflections occur at three positions, i.e., the back surface of the substrate 103, the interface between the substrate 103 and the hollow space 104, and the interface between the hollow space 104 and the infrared ray absorbing film 105. As to the back surface of the substrate 103, reflection can be prevented by forming an antireflection film. However, as to the interface between the substrate 103 and the hollow space 104 and the interface between the hollow space 104 and the infrared ray absorbing film 105, it is difficult to form an antireflection film, and therefore reflection cannot be prevented. In particular, as shown in the configuration of FIG. 15, when performing a method including a procedure of removing a part of the substrate 103 by etching to thermally separate the sensor part 101 from the substrate 103, the procedure of removing part of the substrate 103 by etching is performed toward the end of the method. Thus, antireflection films cannot be formed at the aforementioned interfaces in steps after the hollow space 104 has been formed.

SUMMARY OF THE INVENTION

The present invention provides a thermal infrared sensor and a manufacturing method thereof, in which one or more of the above-described disadvantages are eliminated.

A preferred embodiment of the present invention provides a thermal infrared sensor and a manufacturing method thereof with which the reflection ratio of infrared rays can be reduced at the back surface of an infrared ray absorbing film, in a thermal infrared sensor that receives infrared rays from the back surface of the infrared ray absorbing film.

According to an aspect of the present invention, there is provided a thermal infrared sensor including an infrared ray absorbing film that is thermally separated from a semiconductor substrate by a hollow part; and a temperature sensor configured to detect temperature changes of the infrared ray absorbing film, wherein the infrared ray absorbing film includes an infrared ray antireflection structure configured with a sub wavelength structure, the infrared ray antireflection structure being provided on a surface of the infrared ray absorbing film facing the semiconductor substrate.

According to an aspect of the present invention, there is provided a manufacturing method of a thermal infrared sensor including an infrared ray absorbing film that is thermally separated from a semiconductor substrate by a hollow part and a temperature sensor configured to detect temperature changes of the infrared ray absorbing film, the manufacturing method including forming, by a photoengraving technology and an etching technology, a recess pattern used for forming a sub wavelength structure, the recess pattern being formed on a surface of the semiconductor substrate at a position where a sensor unit including the temperature sensor of the thermal infrared sensor is to be formed; forming, by a thermal oxidation process, the infrared ray absorbing film on the surface of the semiconductor substrate, the infrared ray absorbing film configured with a silicon oxide film having the sub wavelength structure that is formed based on the recess pattern; forming the temperature sensor on the infrared ray absorbing film; forming an interlayer insulating film, wirings, and a protection film to obtain an electric potential of the temperature sensor; forming, by the photoengraving technology and the etching technology, an etching-use opening part in the protection film and the interlayer insulating film so that the etching-use opening part reaches the semiconductor substrate, the etching-use opening part being used for removing a part of the semiconductor substrate immediately below the infrared ray absorbing film; and forming, by a wet etching technology, the hollow part between the infrared ray absorbing film and the semiconductor substrate, the hollow part being formed by removing the part of the semiconductor substrate immediately below the infrared ray absorbing film through the etching-use opening part.

According to an aspect of the present invention, there is provided a manufacturing method of a thermal infrared sensor including an infrared ray absorbing film that is thermally separated from a semiconductor substrate by a hollow part and a temperature sensor configured to detect temperature changes of the infrared ray absorbing film, the manufacturing method including forming a semiconductor layer on the semiconductor substrate via an insulating film; forming, by a photoengraving technology and an etching technology, a recess pattern used for forming a sub wavelength structure, the recess pattern being formed on a surface of the semiconductor layer at a position where a sensor unit including the temperature sensor of the thermal infrared sensor is to be formed; forming, by a thermal oxidation process, the infrared ray absorbing film on the surface of the semiconductor layer, the infrared ray absorbing film configured with a silicon oxide film having the sub wavelength structure that is formed based on the recess pattern; forming the temperature sensor on the infrared ray absorbing film; forming an interlayer insulating film, wirings, and a protection film to obtain an electric potential of the temperature sensor; forming, by the photoengraving technology and the etching technology, an etching-use opening part in the protection film and the interlayer insulating film so that the etching-use opening part reaches the semiconductor layer, the etching-use opening part being used for removing a part of the semiconductor layer immediately below the infrared ray absorbing film; and forming, by a wet etching technology, the hollow part between the infrared ray absorbing film and the semiconductor substrate, the hollow part being formed by removing the part of the semiconductor layer immediately below the infrared ray absorbing film through the etching-use opening part.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of embodiments of the present invention.

Figure 1:
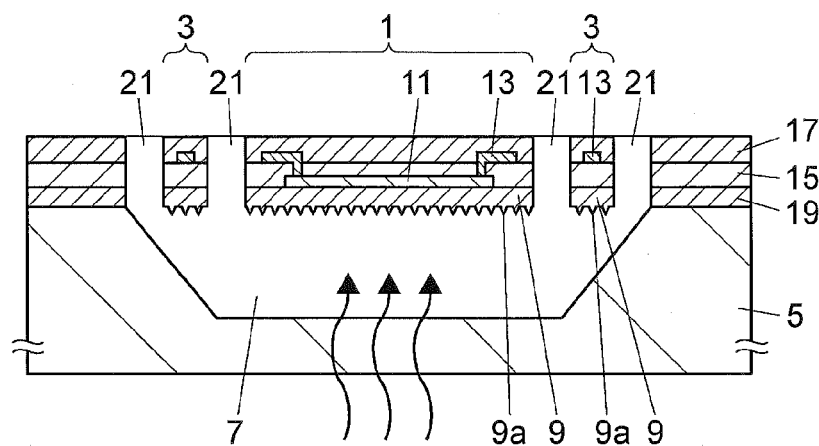
FIG. 1 is a schematic cross-sectional view of a thermal infrared sensor according to one embodiment.
Figure 2:
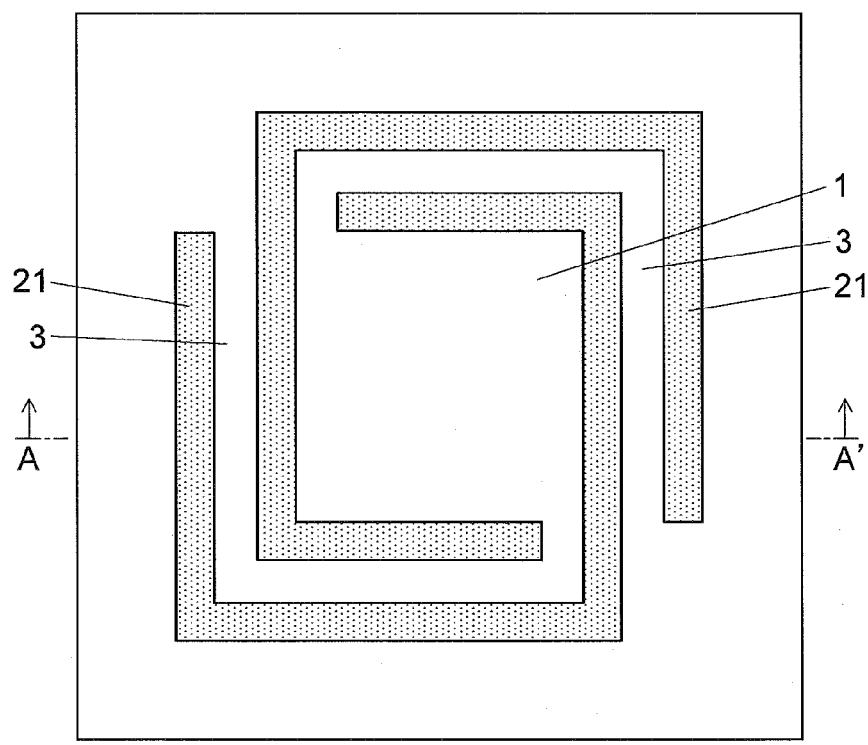
FIG. 2 is a schematic plan view of the embodiment illustrated in FIG. 1.

FIG. 1 is a schematic cross-sectional view of a thermal infrared sensor according to one embodiment. FIG. 2 is a schematic plan view of the embodiment illustrated in FIG. 1. FIG. 1 is a cross-sectional view cut along a line A-A' in FIG. 2.

A sensor part 1 supported by beam parts 3 is facing a silicon substrate (semiconductor substrate) 5 across a hollow space 7. The sensor part 1 includes an infrared ray absorbing film 9, a temperature sensor 11, wirings 13, an interlayer insulating film 15, and a protection film 17. The beam parts 3 include the infrared ray absorbing film 9, the wirings 13, the interlayer insulating film 15, and the protection film 17.

The infrared ray absorbing film 9 is formed with a silicon oxide film. The infrared ray absorbing film 9 is thermally separated from the silicon substrate 5 by the hollow space 7. The infrared ray absorbing film 9 has an infrared ray antireflection structure including a sub wavelength structure 9a provided on the surface facing the silicon substrate 5. The sub wavelength structure 9a is also formed on the infrared ray absorbing film 9 at the beam parts 3. However, the sub wavelength structure 9a does not need to be formed on the infrared ray absorbing film 9 (silicon oxide film) at the beam parts 3.

The temperature sensor 11 is formed on the infrared ray absorbing film 9. In the present embodiment, for example, a PN diode, a MOSFET, a thermistor, a bolometer, a thermopile, and a pyroelectric element may be used as the temperature sensor. In the present embodiment, the temperature sensor 11 is formed with a PN connection diode formed on a polysilicon film formed on the infrared ray absorbing film 9, or a thermopile including N+polysilicon and N−polysilicon.

A silicon oxide film 19 is formed on the front surface of the silicon substrate 5 at different positions from those of the sensor part 1 and the beam parts 3. The silicon oxide film 19 is formed at the same time as the infrared ray absorbing film 9, but does not include the sub wavelength structure 9a.

However, the silicon oxide film 19 may have the sub wavelength structure 9a provided at the junction plane between the silicon oxide film 19 and the silicon substrate 5. The interlayer insulating film 15 and the protection film 17 may also be formed on the silicon oxide film 19.

Etching-use opening parts 21 are formed in the protection film 17, the interlayer insulating film 15, the infrared ray absorbing film 9, and the silicon oxide film 19. The positions where the sensor part 1 and the beam parts 3 are to be formed are demarcated by the etching-use opening parts 21. The beam parts 3 satisfy their purposes as long as they have structures for supporting at least the wirings 13 and the sensor part 1.

In the thermal infrared sensor according to the present embodiment, infrared rays enter from the back surface of the silicon substrate 5. The thermal infrared sensor according to the present embodiment has an infrared ray antireflection structure including the sub wavelength structure 9a provided on the surface of the infrared ray absorbing film 9 facing the silicon substrate 5. Therefore, it is possible to reduce the reflection ratio of infrared rays at the back surface of the infrared ray absorbing film 9. Accordingly, the sensitivity of the thermal infrared sensor can be increased.

Figure 3:
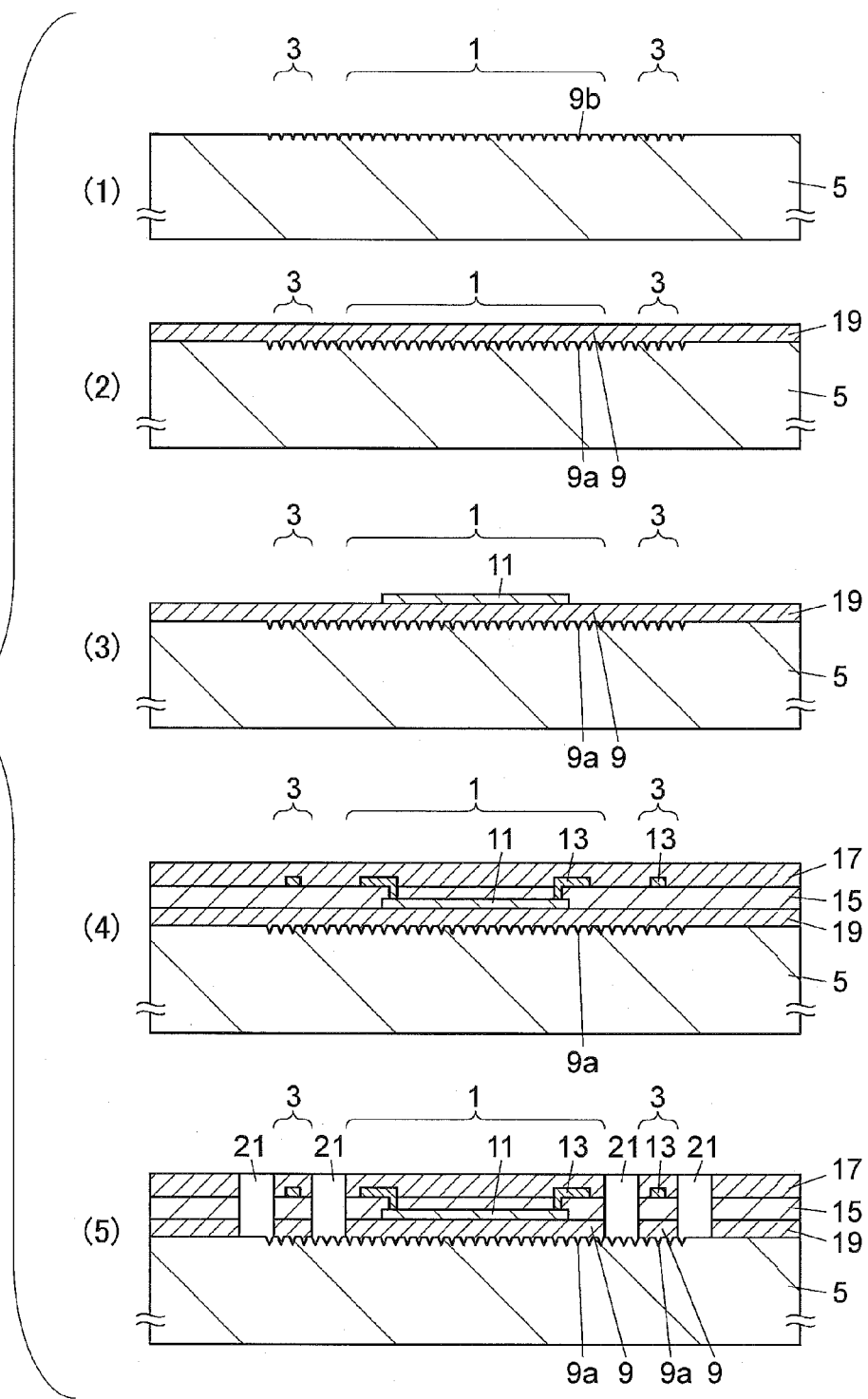
FIG. 3 shows cross-sectional views for describing steps of an embodiment of a first aspect of a manufacturing method of the embodiment in FIG. 1.

FIG. 3 shows cross-sectional views for describing steps of an embodiment of a first aspect of a manufacturing method of the embodiment in FIG. 1. FIGS. 4A through 7C illustrate examples of the recess pattern for forming the sub wavelength structure formed at step (1) of the present embodiment and the silicon oxide film functioning as the infrared ray absorbing film formed at step (2) of the present embodiment. In FIGS. 4A through 7C, figure numbers accompanied by "A" are plan views of the recess pattern for forming the sub wavelength structure, figure numbers accompanied by "B" are cross-sectional views cut along a line X-X' in the corresponding plan view, and figure numbers accompanied by "C" are cross-sectional views of the silicon oxide film functioning as the infrared ray absorbing film.

(1) By a photoengraving technology and an etching technology, a recess pattern 9b for forming the sub wavelength structure is formed on the surface of the silicon substrate 5 where the sensor part 1 of the thermal infrared sensor is to be formed. The recess pattern 9b is formed in consideration of the thermal oxidation process of step (2) described below. In the present embodiment, the recess pattern 9b is also formed at the positions where the beam parts 3 are to be formed.

Figure 4A:
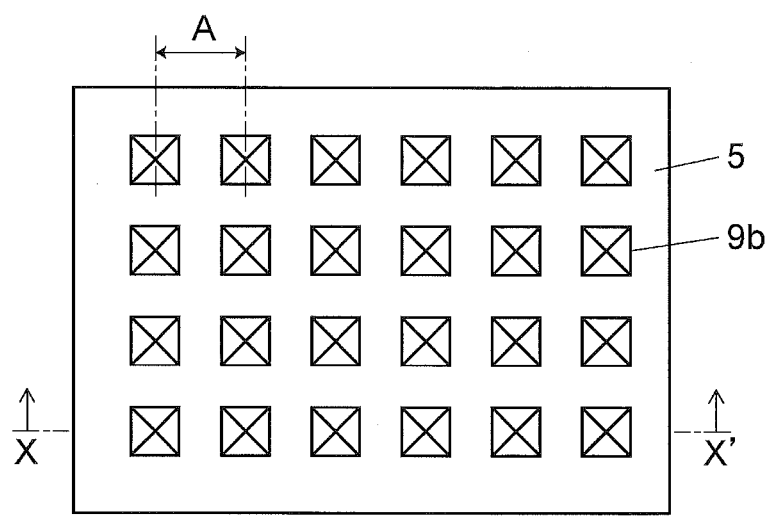
FIGS. 4A through 4C illustrate an example of a recess pattern for forming the sub wavelength structure formed at step (1) of the embodiment shown in FIGS. 1 through 3 and a silicon oxide film functioning as an infrared ray absorbing film formed at step (2) thereof.
Figure 4B:
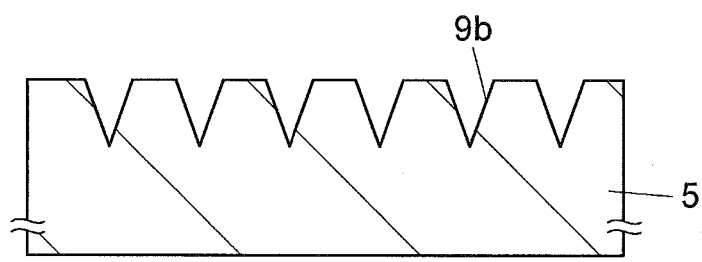
Figure 4C:
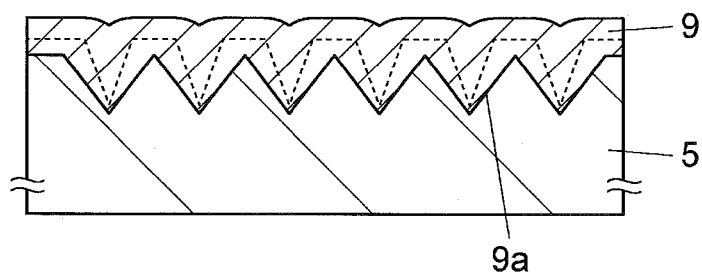
Figure 5A:
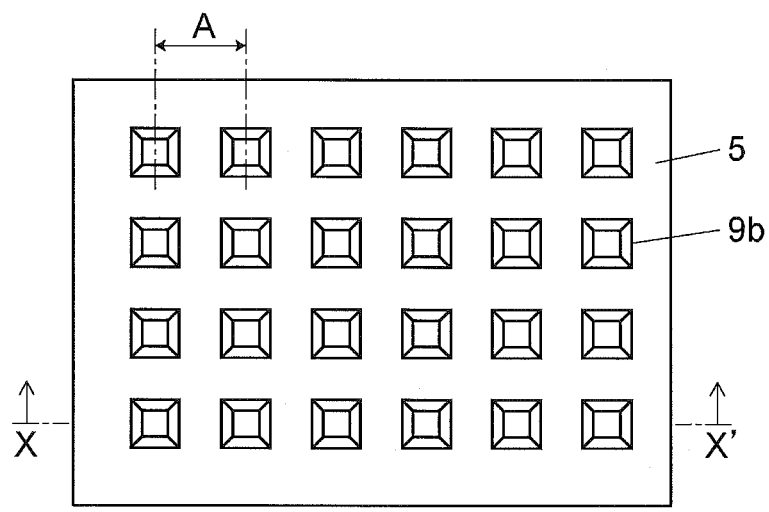
FIGS. 5A through 5C illustrate another example of a recess pattern for forming the sub wavelength structure formed at step (1) of the embodiment shown in FIGS. 1 through 3 and a silicon oxide film functioning as an infrared ray absorbing film formed at step (2) thereof.
Figure 5B:
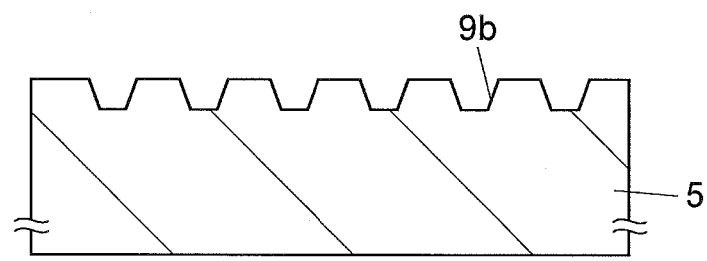
Figure 5C:
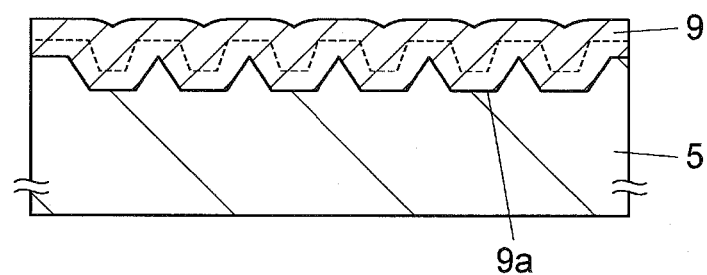
Figure 6A:
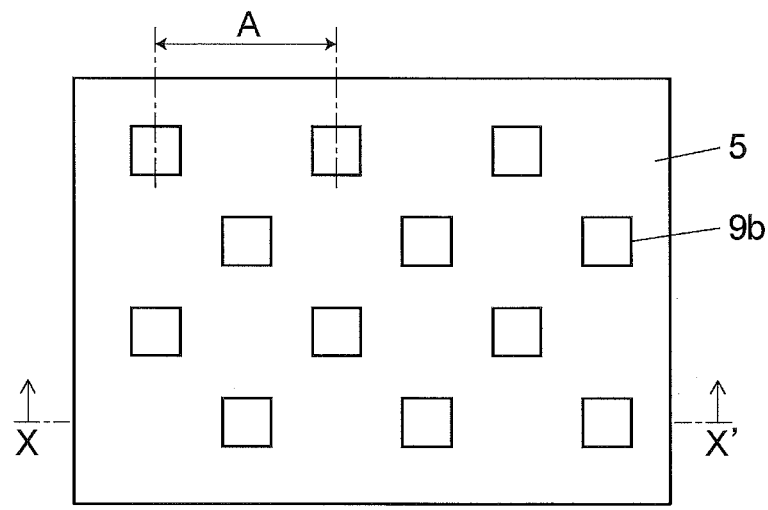
FIGS. 6A through 6C illustrate yet another example of a recess pattern for forming the sub wavelength structure formed at step (1) of the embodiment shown in FIGS. 1 through 3 and a silicon oxide film functioning as an infrared ray absorbing film formed at step (2) thereof.
Figure 6B:
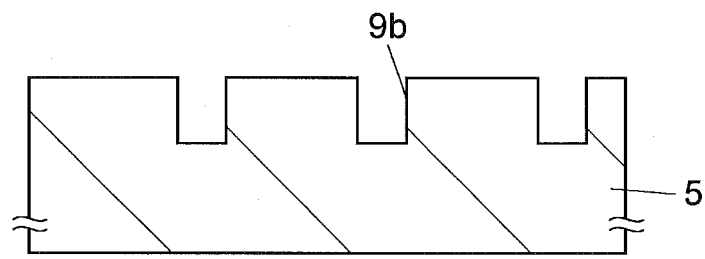
Figure 6C:
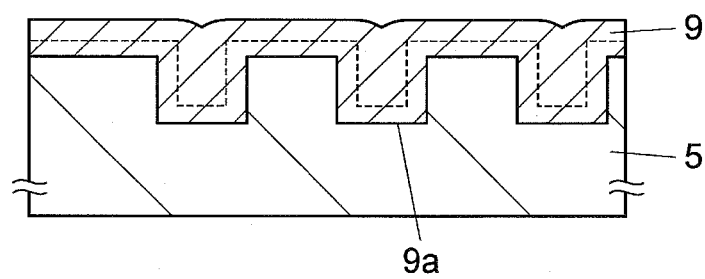
Figure 7A:
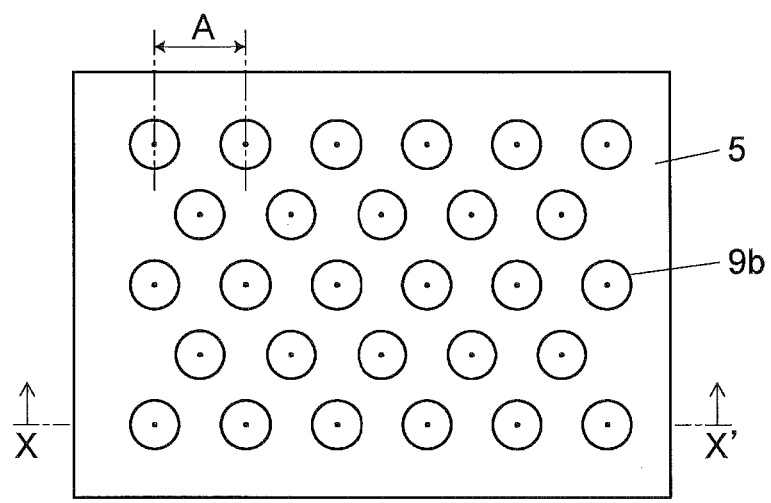
FIGS. 7A through 7C illustrate yet another example of a recess pattern for forming the sub wavelength structure formed at step (1) of the embodiment shown in FIGS. 1 through 3 and a silicon oxide film functioning as an infrared ray absorbing film formed at step (2) thereof.
Figure 7B:
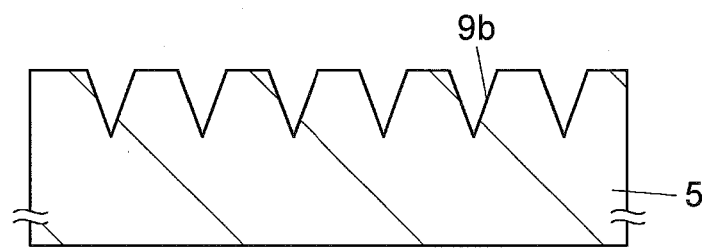
Figure 7C:
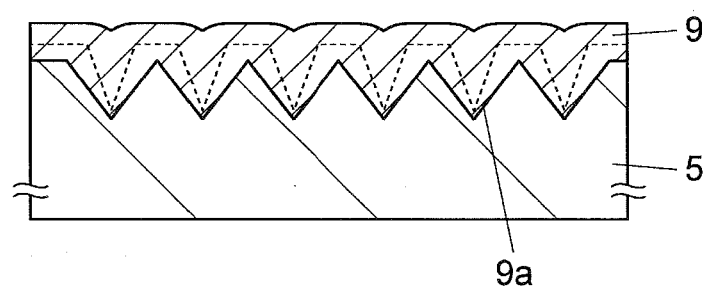

Examples of the recess pattern 9b are described with reference to FIGS. 4A through 7C. In FIGS. 4A and 4B, the recess pattern 9b includes square pyramids arranged in a lattice. In FIGS. 5A and 5B, the recess pattern 9b includes truncated square pyramids arranged in a lattice. In FIGS. 6A and 6B, the recess pattern 9b includes cuboids with square bottom surfaces arranged in a zigzag alignment. In FIGS. 7A and 7B, the recess pattern 9b includes circular cones arranged in a zigzag alignment.

The pitch A of the recess pattern 9b needs to be less than or equal to the wavelength of the infrared rays that are the targets. For example, when infrared rays emitted from the human body are the targets, the wavelength of such infrared rays is approximately 7 μm through 15 μm, and therefore the pitch A of the recesses is to be no more than 7 μm. The configuration of the recess pattern 9b can be formed by anisotropic dry etching, and by changing the conditions of etching, cone-shaped recesses or vertical-formed recesses can be formed. The shapes and arrangements of the recess pattern 9b are not limited to those illustrated in FIGS. 4A through 7C. For example, the recess pattern 9b may include circular truncated cones or pyramids and truncated pyramids having bottom surfaces that are not square.

Referring back to FIG. 3, descriptions of the manufacturing procedures are continued below.

(2) A thermal oxidation process is performed to form the silicon oxide film 19 on the surface of the silicon substrate 5. At the interface between the silicon oxide film 19 and the silicon substrate 5, the sub wavelength structure 9a is formed based on the recess pattern 9b. In the present embodiment, the parts of the silicon oxide film 19 corresponding to the sensor part 1 and the beam parts 3 configure the infrared ray absorbing film 9 (see FIGS. 4C, 5C, 6C, and 7C).

(3) The temperature sensor 11 is formed on the infrared ray absorbing film 9. A PN diode, a MOSFET, a thermistor, a bolometer, a thermopile, and a pyroelectric element may be used as the temperature sensor 11. In one example, a polysilicon film is deposited, and an ion implantation process and an impurity diffusion process are performed on the polysilicon film to form the temperature sensor 11 configured with the PN connection diode or a thermopile including N+polysilicon and N−polysilicon. Accordingly, the temperature sensor 11 is easily formed.

(4) In order to obtain the electrical potential of the temperature sensor 11, a regular semiconductor device manufacturing process is performed, including steps of forming the interlayer insulating film 15, forming contact holes, forming the wirings 13, and forming the protection film 17. The interlayer insulating film 15 and the protection film 17 may be a CVD (Chemical Vapor Deposition) oxide film used in a typical semiconductor device manufacturing process, such as BPSG (Boro-phospho silicate glass), NSG (None-doped Silicate Glass), PSG (phospho silicate glass), and TEOS (tetra ethyl ortho silicate). The protection film 17 may be a CVD nitride film or a laminated film including a CVD nitride film and a CVD oxide film.

(5) By a photoengraving technology and an etching technology, the etching-use opening parts 21 are formed in the protection film 17 and the interlayer insulating film 15. The etching-use opening parts 21 are used for removing the part of the silicon substrate 5 located immediately below the infrared ray absorbing film 9. The etching-use opening parts 21 reach the silicon substrate 5. The positions where the sensor part 1 and the beam parts 3 are to be formed are demarcated by the etching-use opening parts 21.

(6) This step is described with reference to FIG. 1. By a wet etching technology, the part of the silicon substrate 5 located immediately below the infrared ray absorbing film 9 is removed through the etching-use opening parts 21. Accordingly, the hollow space 7 is formed between the infrared ray absorbing film 9 and the silicon substrate 5. The silicon substrate 5 is preferably etched by a method in which the etching selectivity of silicon and the silicon oxide film is high. For example, crystal anisotropic wet etching using an alkaline solution such as a KOH (potassium hydroxide) water solution and a TMAH (tetramethylammonium hydroxide) water solution, or isotropic dry etching using $XeF_2$ (xenon difluoride), $CF_4$ (carbon tetrafluoride), and $SF_6$ (sulfur hexafluoride) may be performed. Furthermore, when the etching selectivity of the interlayer insulating film 15 or the protection film 17 and the silicon substrate 5 is low, it is necessary to form a hard mask (silicon nitride film) for etching protection on the side surfaces of the etching-use opening parts 21 and the front surface of the protection film 17. FIG. 1 illustrates a case where crystal anisotropic wet etching is performed to etch the silicon substrate 5. In the case of crystal anisotropic wet etching, the etching stops at the (111) surface of silicon, and therefore the hollow space 7 having a shape as illustrated in FIG. 1 is formed in the silicon substrate 5. At the same time, the sub wavelength structure 9a is exposed in the hollow space 7. The sub wavelength structure 9a is formed with a silicon oxide film, and therefore the etched amount is smaller compared to silicon. Thus, the sub wavelength structure 9a having recesses and protrusions formed in advance appear on the surface of the infrared ray absorbing film 9.

As described above, in the first aspect of the manufacturing method according to an embodiment of the present invention, a thermal infrared sensor is formed, which has an infrared ray antireflection structure including the sub wavelength structure 9a provided on the surface of the infrared ray absorbing film 9 facing the silicon substrate 5.

Figure 8:
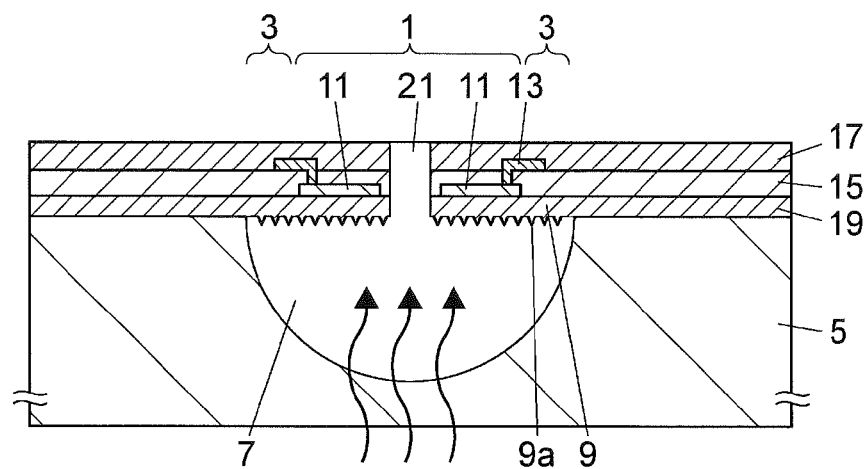
FIG. 8 is a schematic cross-sectional view of a thermal infrared sensor according to another embodiment.

FIG. 8 is a schematic cross-sectional view of a thermal infrared sensor according to another embodiment. Elements having the same functions as those of FIG. 1 are denoted by the same reference numerals.

In the present embodiment, the etching-use opening part 21 is formed in the center of the sensor part 1. The temperature sensor 11 is patterned so as not to be exposed in the etching-use opening part 21. The hollow space 7 is formed by isotropic dry etching using the etching-use opening part 21. The hollow space 7 has a substantially circular shape in a planar view. The beam parts 3 are formed with the infrared ray absorbing film 9, the interlayer insulating film 15, and the protection film 17, on the periphery of the hollow space 7. In the present embodiment also, the sub wavelength structure 9a is formed on the back surface of the infrared ray absorbing film 9.

The structure illustrated in FIG. 8 is formed as follows. In the manufacturing method described with reference to FIG. 3, the position of forming the sub wavelength structure 9a in step (1), the position of forming the temperature sensor 11 in step (3), the position of forming the wirings 13 in step (4), and the position of forming the etching-use opening part 21 in step (5) are changed to the respective positions as indicated in FIG. 8. Isotropic dry etching is performed to remove a part of the silicon substrate 5 through the etching-use opening part 21 and form the hollow space 7.

In the embodiment illustrated in FIG. 1, when the temperature sensor 11 is a diode or a MOSFET, it is not possible to use single crystal silicon. In the embodiment illustrated in FIG. 1, a diode, etc., is formed on a polysilicon film to form the temperature sensor 11. However, compared to the case of a device formed on polysilicon, a device formed on single crystal silicon is more advantageous in terms of having less leakage current and highly uniform properties. Thus, if a temperature sensor can be formed on single crystal silicon, the S/N ratio of the thermal infrared sensor can be improved and stability and uniformity can be enhanced.

Figure 9:
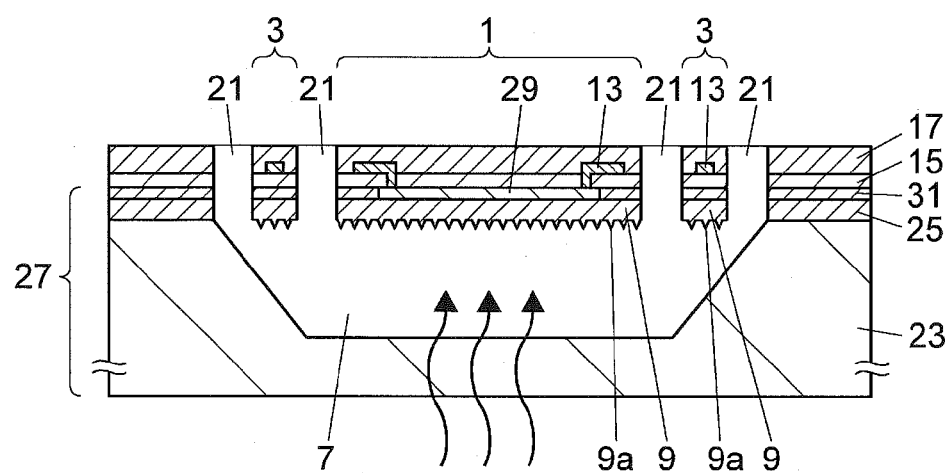
FIG. 9 is a schematic cross-sectional view of a thermal infrared sensor according to yet another embodiment.

FIG. 9 is a schematic cross-sectional view of a thermal infrared sensor according to yet another embodiment. Elements having the same functions as those of FIG. 1 are denoted by the same reference numerals.

The present embodiment uses a supporting substrate 23 formed with a silicon substrate, a BOX (buried oxide) layer 25 formed with a silicon oxide film, and an SOI (silicon-on-insulator) substrate 27 including a single crystal silicon layer. A temperature sensor 29 is formed on the single crystal silicon layer of the SOI substrate 27. The temperature sensor 29 is formed with a PN connection diode, or a thermopile including N+polysilicon and N−polysilicon, formed on the single crystal silicon layer of the SOI substrate 27. The single crystal silicon layer of the SOI substrate 27 at positions other than the position where the temperature sensor 29 is formed is oxidized by, for example, a LOCOS (Local Oxidation of Silicon) method for the purpose of element separation, so that an element separation oxide film 31 is formed.

The positions on the BOX layer 25 where the sensor part 1 and the beam parts 3 are formed constitute the infrared ray absorbing film 9. On the back surface of the infrared ray absorbing film 9 (surface facing the supporting substrate 23), the sub wavelength structure 9a is formed.

Figure 10:
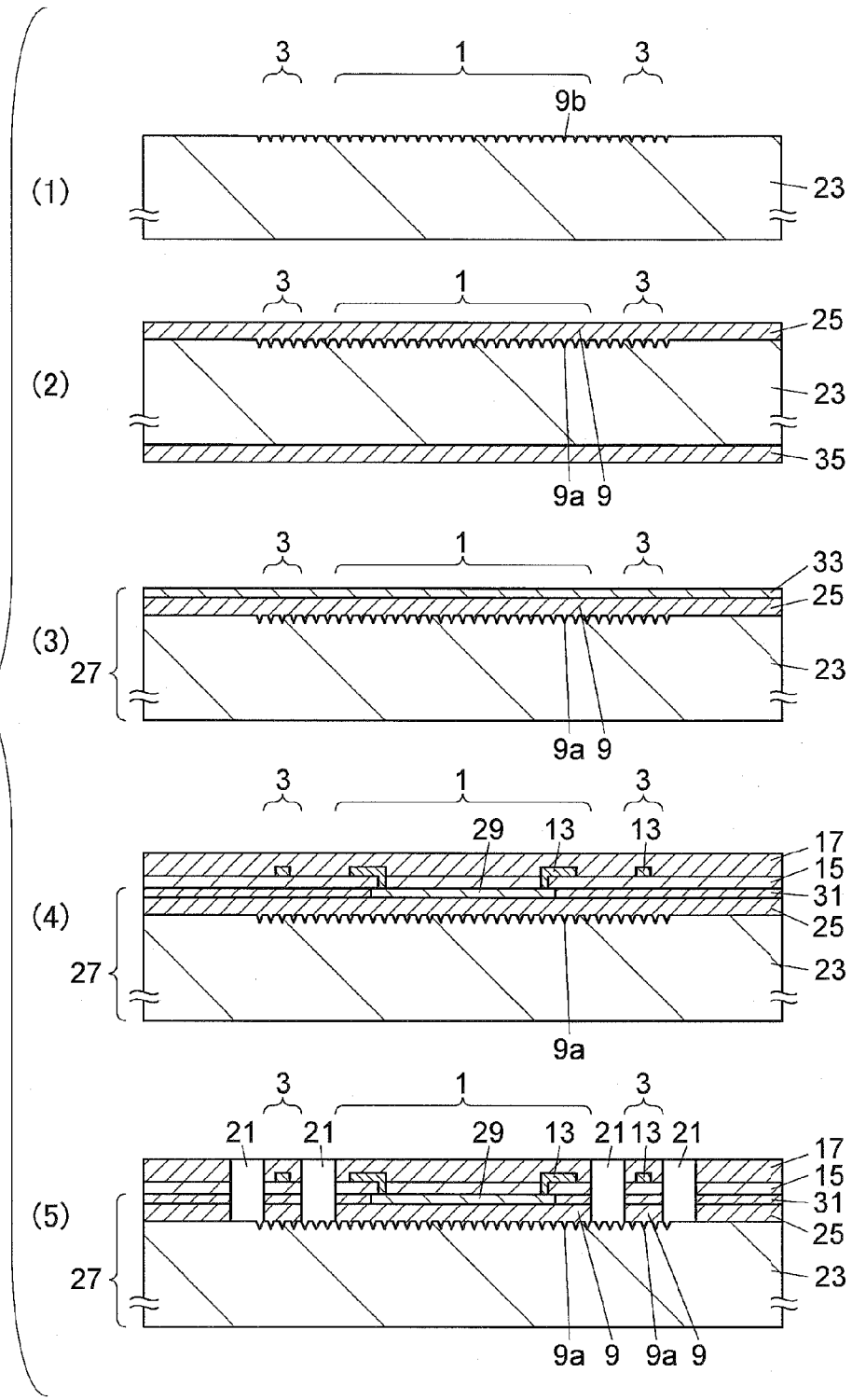
FIG. 10 shows cross-sectional views for describing steps of another embodiment of the first aspect of a manufacturing method of the embodiment in FIG. 9.

FIG. 10 shows cross-sectional views for describing steps of another embodiment of the first aspect of a manufacturing method of the embodiment in FIG. 9.

(1) By a photoengraving technology and an etching technology, the recess pattern 9b for forming the sub wavelength structure is formed on the surface of the supporting substrate 23 where the sensor part 1 of the thermal infrared sensor is to be formed. The recess pattern 9b is formed in consideration of the thermal oxidation process of step (2) described below. In the present embodiment, the recess pattern 9b is also formed at the positions where the beam parts 3 are to be formed.

(2) A thermal oxidation process is performed to form the BOX layer 25 on the front surface of the supporting substrate 23. At this time, the back surface of the supporting substrate 23 is oxidized, and a silicon oxide film 35 is formed. At the interface between the BOX layer 25 and the supporting substrate 23, the sub wavelength structure 9a is formed based on the recess pattern 9b. In the present embodiment, the parts of the BOX layer 25 corresponding to the sensor part 1 and the beam parts 3 configure the infrared ray absorbing film 9. A polishing process is performed on the front surface of the BOX layer 25 to remove recesses and protrusions formed on the surface of the BOX layer 25 due to the recess pattern 9b, and flatten the surface of the BOX layer 25.

(3) A single crystal silicon layer 33 is adhered onto the BOX layer 25, and the single crystal silicon layer 33 is polished to have a desired thickness. The silicon oxide film 35 on the back surface of the supporting substrate 23 is removed. Accordingly, the SOI substrate 27 including the supporting substrate 23, the BOX layer 25, and the single crystal silicon layer 33 is formed.

(4) In order to demarcate the position where to form the temperature sensor 29, the element separation oxide film 31 is formed on the single crystal silicon layer 33 by a LOCOS method, for example. An ion implantation process and an impurity diffusion process are performed on the single crystal silicon layer 33 at the position where the sensor part 1 is to be formed, to form the temperature sensor 29. In this case, a PN connection diode, or a thermopile including N+polysilicon and N−polysilicon are formed. Furthermore, a step of forming a gate oxide film and a gate electrode may be added to form a temperature sensor formed with MOSFET. Subsequently, in order to obtain the electrical potential of the temperature sensor 29, a regular semiconductor device manufacturing process is performed, including steps of forming the interlayer insulating film 15, forming contact holes, forming the wirings 13, and forming the protection film 17.

(5) The etching-use opening parts 21 are formed in a similar manner to that of step (5) described above with reference to FIG. 3.

(6) This step is described with reference to FIG. 9. In the similar manner as that of step (6) described above with reference to FIG. 3, a crystal anisotropic wet etching technology is used to remove, through the etching-use opening parts 21, the part of the supporting substrate 23 located immediately below the infrared ray absorbing film 9, to form the hollow space 7 between the infrared ray absorbing film 9 and the supporting substrate 23. The isotropic dry etching technology for forming the hollow space 7 described with reference to FIG. 8 is also applicable to the present embodiment.

As described above, according to the present embodiment, a thermal infrared sensor shown in FIG. 9 is formed, which has an infrared ray antireflection structure including the sub wavelength structure 9a provided on the surface of the infrared ray absorbing film 9 facing the supporting substrate 23, and which has the temperature sensor 29 formed on the single crystal silicon layer.

Figure 11:
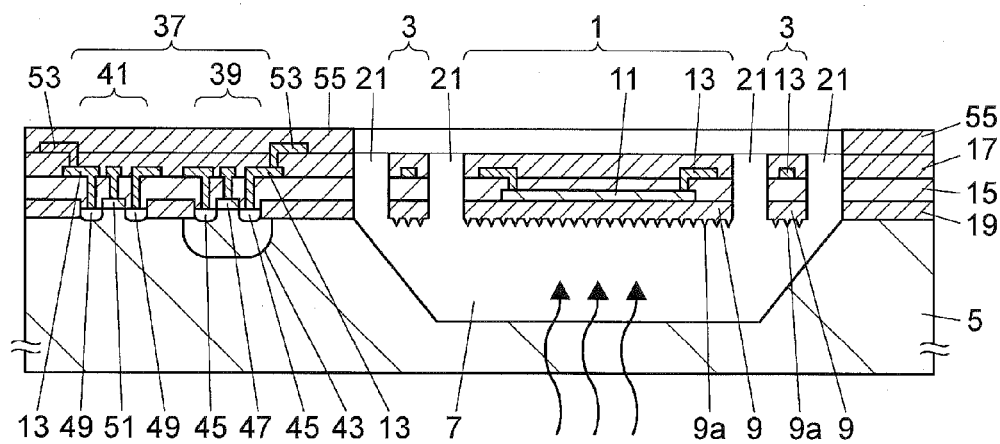
FIG. 11 is a schematic cross-sectional view of a thermal infrared sensor according to yet another embodiment.

FIG. 11 is a schematic cross-sectional view of a thermal infrared sensor according to yet another embodiment. The structures of the sensor part 1 and the beam parts 3 of the present embodiment are the same as those illustrated in FIG. 1.

In the present embodiment, the silicon substrate 5 is further provided with a CMOS (Complementary Metal Oxide Semiconductor) circuit part 37. The CMOS circuit part 37 includes a P-channel MOSFET 39 and an N-channel MOSFET 41. For example, when the silicon substrate 5 is a P-type silicon substrate, the P-channel MOSFET 39 is formed in an N-type well 43 formed in the silicon substrate 5, and the N-channel MOSFET 41 is formed on the silicon substrate 5 or in a P-type well (not shown) formed in the silicon substrate 5. The positions of forming the P-channel MOSFET 39 and the N-channel MOSFET 41 are demarcated by the silicon oxide film 19 used for element separation, which is formed with a LOCOS oxide film.

The P-channel MOSFET 39 is provided with two P-type impurity diffusion layers 45 respectively constituting a source and a drain formed in the N-type well 43, and a polysilicon gate electrode 47 formed via a gate oxide film (not shown) on the N-type well 43 between the two P-type impurity diffusion layers 45.

The N-channel MOSFET 41 includes two N-type impurity diffusion layers 49 respectively constituting a source and a drain formed in the silicon substrate 5, and a polysilicon gate electrode 51 formed via a gate oxide film (not shown) on the silicon substrate 5 between the two N-type impurity diffusion layers 49.

The wirings 13 are formed in order to obtain the electrical potential of the P-type impurity diffusion layers 45, the N-type impurity diffusion layers 49, and the polysilicon gate electrodes 47 and 51. The protection film 17 formed on the interlayer insulating film 15 and the wirings 13 constitute a second interlayer insulating film. A second layer of wirings 53 is formed on the protection film 17. The wirings 53 are connected, through via holes formed in the protection film 17, to the wirings 13 connected to the P-channel MOSFET 39 and the N-channel MOSFET 41. The wirings 53 are not formed at the sensor part 1 or the beam parts 3.

A final protection film 55 is formed on the protection film 17 and the wirings 53. The final protection film 55 is formed with a CVD nitride film or a laminated film including a CVD oxide film and a CVD nitride film. The final protection film 55 is not formed at the sensor part 1 or the beam parts 3.

When the silicon oxide film 19 used for element separation is formed by the LOCOS method to demarcate the areas for forming the P-channel MOSFET 39 and the N-channel MOSFET 41, it is also possible to form the infrared ray absorbing film 9 and the sub wavelength structure 9a at the sensor part 1 and the beam parts 3. In this case, the process time of LOCOS oxidation and the film thickness are determined according to the manufacturing process of the CMOS circuit part 37, and thus cannot be significantly changed. Therefore, the size and pitch of the recess/protrusion structure formed on the silicon substrate 5 is to be considered such that the sub wavelength structure 9a at the sensor part 1 and the beam parts 3 can be formed without any problem under the condition of LOCOS oxidation. Particularly, when there are large recesses and protrusions on the front surface of the infrared ray absorbing film 9 (the side of the ray absorbing film 9 opposite to the side on which the sub wavelength structure 9a is formed), a failure may occur when depositing polysilicon for forming the temperature sensor 11 that is to be formed subsequently. That is to say, the size and pitch of the recess/protrusion structure are preferably small, so that the surface of the infrared ray absorbing film 9 becomes fairly flat within the oxidation time in the LOCOS step.

After the silicon oxide film 19 and the infrared ray absorbing film 9 are formed after LOCOS oxidation, the gate oxide films (not shown) of the P-channel MOSFET 39 and the N-channel MOSFET 41 are formed, and polysilicon is deposited. The polysilicon for forming the temperature sensor 11 of the sensor part 1 and the polysilicon for forming the polysilicon gate electrodes 47 and 51 of the P-channel MOSFET 39 and the N-channel MOSFET 41 may be formed in the same step. Subsequently, an ion implantation process and an impurity diffusion process are performed on the polysilicon gate electrodes 47 and 51. The steps of the ion implantation process and the impurity diffusion process may also serve as steps of forming the temperature sensor 11.

Furthermore, the thermal capacity of the sensor part 1 is preferably reduced for the purpose of increasing response speed. Thus, in the present embodiment, at the position where the sensor part 1 is formed, the final protection film 55 is removed so that the film thickness of the sensor part 1 is thinner than that of the CMOS circuit part 37, thereby reducing the thermal capacity. The protection film 17 functioning as an interlayer insulating film at the CMOS circuit part 37, functions as a protection film of the sensor part 1.

As described above, the step of forming the base of the sub wavelength structure by thermal oxidation may also serve as the LOCOS step of the CMOS process. Therefore, without particularly considering the impact on the CMOS process, the sub wavelength structure 9a may be formed relatively easily only be adding a step of forming the recess/protrusion structure (recess pattern for forming sub wavelength structure) on the silicon substrate.

Figure 12:
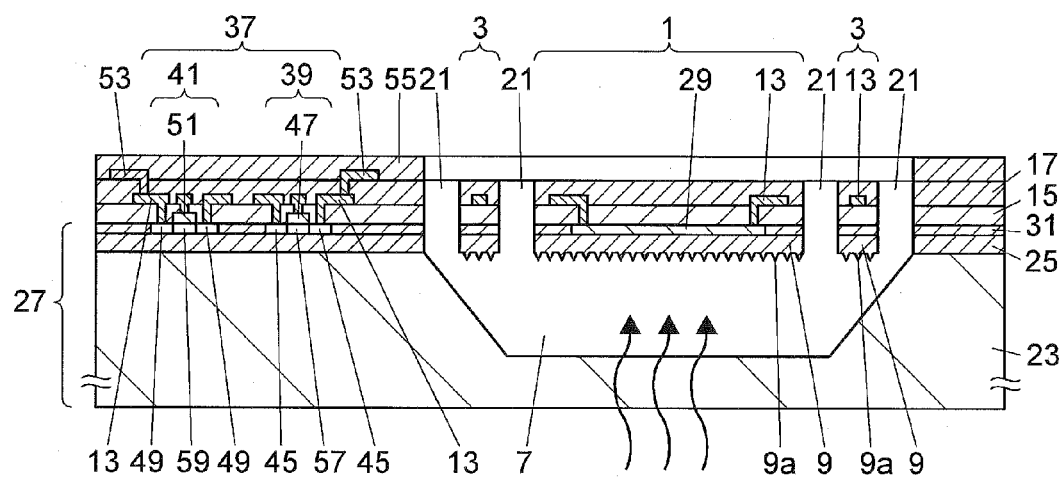
FIG. 12 is a schematic cross-sectional view of a thermal infrared sensor according to yet another embodiment.

FIG. 12 is a schematic cross-sectional view of a thermal infrared sensor according to yet another embodiment. The structures of the sensor part 1 and the beam parts 3 of the present embodiment are the same as those illustrated in FIG. 9.

In the present embodiment, the SOI substrate 27 is further provided with the CMOS circuit part 37. The CMOS circuit part 37 is provided with the P-channel MOSFET 39 and the N-channel MOSFET 41. The P-channel MOSFET 39 is formed on an N-type single crystal silicon layer 57 formed on a single crystal silicon layer of the SOI substrate 27. The N-channel MOSFET 41 is formed on a P-type single crystal silicon layer 59 formed on the single crystal silicon layer of the SOI substrate 27. The positions of forming the P-channel MOSFET 39 and the N-channel MOSFET 41 are demarcated by the element separation oxide film 31 used for element separation formed with, for example, a LOCOS oxide film, which is formed on the single crystal silicon layer of the SOI substrate 27.

The P-channel MOSFET 39 is provided with two P-type impurity diffusion layers 45 respectively constituting a source and a drain formed on the N-type single crystal silicon layer 57, and the polysilicon gate electrode 47 formed via a gate oxide film (not shown) on the N-type single crystal silicon layer 57 between the two P-type impurity diffusion layers 45.

The N-channel MOSFET 41 includes two N-type impurity diffusion layers 49 respectively constituting a source and a drain formed on the P-type single crystal silicon layer 59, and the polysilicon gate electrode 51 formed via a gate oxide film (not shown) on the P-type single crystal silicon layer 59 between the two N-type impurity diffusion layers 49.

The configurations of the wirings 13, the interlayer insulating film 15, the protection film 17, the second layer of wirings 53, and the final protection film 55 are the same as those illustrated in FIG. 11. In the present embodiment, the final protection film 55 is not formed at the sensor part 1 or the beam parts 3.

When the SOI substrate 27 is used as in the present embodiment, the sub wavelength structure 9a is formed at the time of forming the SOI substrate 27, and therefore there are no precautions to be considered when forming the CMOS circuit part 37. When the silicon substrate 5 is used as in FIG. 11, it is necessary to consider the LOCOS oxide film thickness and the shape of the sub wavelength structure 9a of the infrared ray absorbing film 9 of the sensor part 1; however, these factors do not need to be considered when the SOI substrate 27 is used. When the SOI substrate 27 is used, the sensor part 1 and the CMOS circuit part 37 can easily be made monolithic.

Furthermore, the same ion implantation process and impurity diffusion process may be performed to form the temperature sensor 29 as well as the source, drain, and polysilicon gate electrode of the P-channel MOSFET 39 and the N-channel MOSFET 41.

In the embodiment of FIG. 11 and the embodiment of FIG. 12, the hollow space 7 is formed by crystal anisotropic wet etching; however, it is needles to say that the hollow space 7 of these embodiments may be formed by isotropic dry etching and isotropic wet etching.

Figure 13:
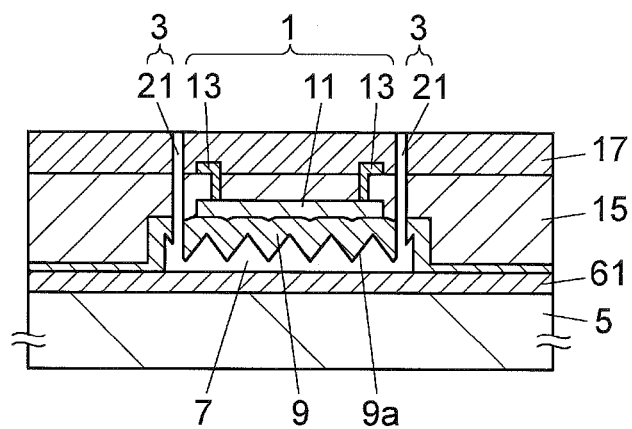
FIG. 13 is a schematic cross-sectional view of a thermal infrared sensor according to yet another embodiment.

FIG. 13 is a schematic cross-sectional view of a thermal infrared sensor according to yet another embodiment. The structures of the sensor part 1 and the beam parts 3 of the present embodiment are the same as those illustrated in FIG. 1.

A silicon oxide film (insulating film) 61 used for element separation formed with, for example, a LOCOS oxide film, is formed on the surface of the silicon substrate 5. The sensor part 1 and the beam parts 3 are formed on the silicon oxide film 61.

The sensor part 1 supported by the beam parts 3 is facing the silicon substrate 5 across the hollow space 7. The sensor part 1 includes the infrared ray absorbing film 9, the temperature sensor 11, the wirings 13, the interlayer insulating film 15, and the protection film 17. The beam parts 3 include the infrared ray absorbing film 9, the wirings 13, the interlayer insulating film 15, and the protection film 17.

The infrared ray absorbing film 9 is formed with a silicon oxide film. The infrared ray absorbing film 9 is thermally separated from the silicon oxide film 61 and the silicon substrate 5 by the hollow space 7. The infrared ray absorbing film 9 has an infrared ray antireflection structure including the sub wavelength structure 9a provided on the surface facing the silicon substrate 5.

The temperature sensor 11 is formed on the infrared ray absorbing film 9. In the present embodiment, for example, the temperature sensor 11 is formed with a PN connection diode formed on a polysilicon film formed on the infrared ray absorbing film 9, or a thermopile including N+polysilicon and N−polysilicon.

The etching-use opening parts 21 are formed in the protection film 17, the interlayer insulating film 15, and the infrared ray absorbing film 9. The positions where the sensor part 1 and the beam parts 3 are to be formed are demarcated by the etching-use opening parts 21. The beam parts 3 satisfy their purposes as long as they have structures for supporting at least the wirings 13 and the sensor part 1.

In the thermal infrared sensor according to the present embodiment, infrared rays enter from the back surface of the silicon substrate 5. The thermal infrared sensor according to the present embodiment has an infrared ray antireflection structure including the sub wavelength structure 9a provided on the surface of the infrared ray absorbing film 9 facing the silicon substrate 5, similar to the embodiment of FIG. 1. Therefore, it is possible to reduce the reflection ratio of infrared rays at the back surface of the infrared ray absorbing film 9. Accordingly, the sensitivity of the thermal infrared sensor can be increased.

Figure 14:
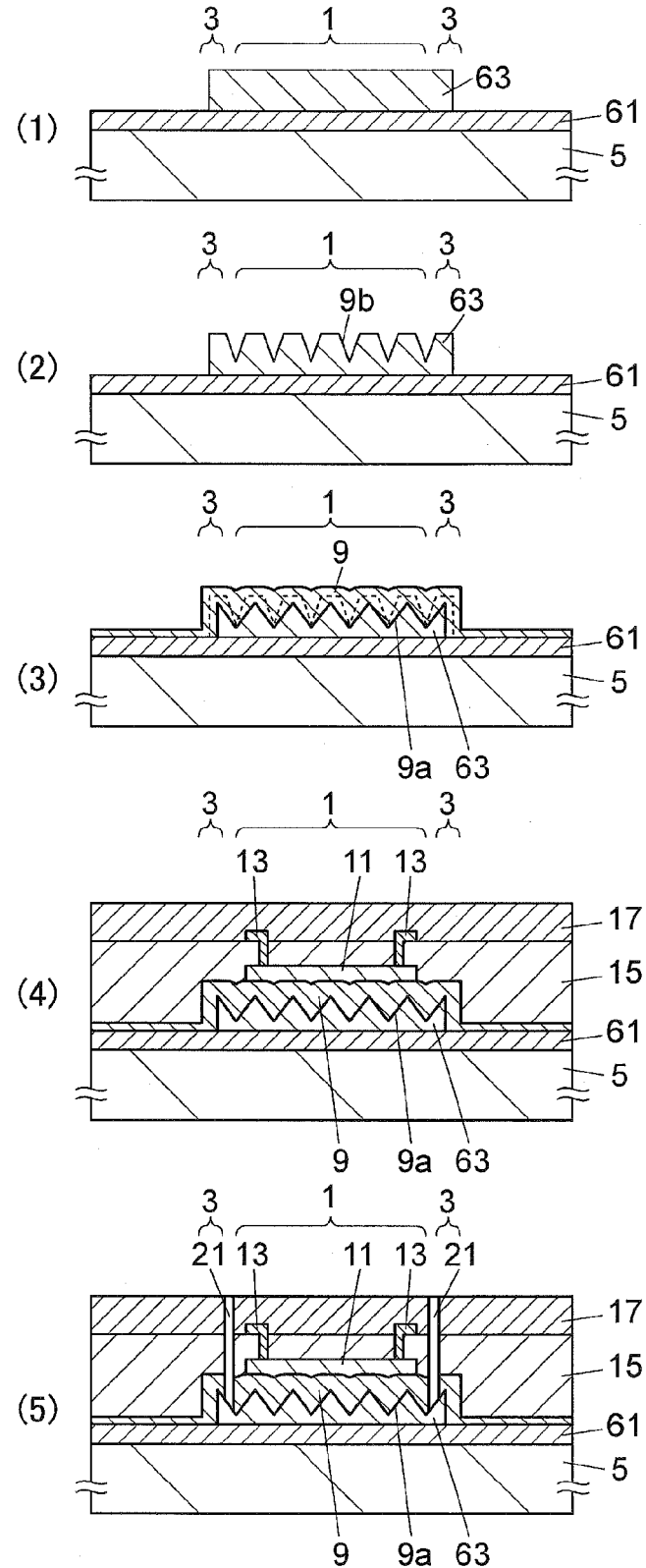
FIG. 14 shows cross-sectional views for describing steps of an embodiment of a second aspect of a manufacturing method of the embodiment in FIG. 13.
Figure 15:
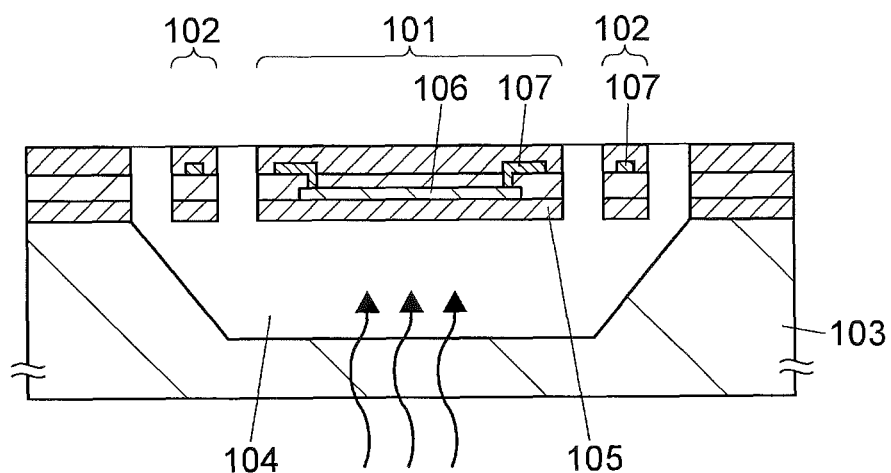
FIG. 15 is a schematic cross-sectional view of an example of a conventional thermal infrared sensor.

FIG. 14 shows cross-sectional views for describing steps of an embodiment of a second aspect of a manufacturing method of the embodiment in FIG. 13.

(1) For example by a LOCOS method, the silicon oxide film 61 is formed on the surface of the silicon substrate 5. By a CVD method, a polysilicon film is formed on the silicon oxide film 61. The polysilicon film is subjected to patterning by a photoengraving technology and an etching technology, to form a polysilicon film pattern (semiconductor layer) 63 on the silicon oxide film 61 at a position where the sensor part 1 of the thermal infrared sensor is to be formed.

(2) By a photoengraving technology and an etching technology, the recess pattern 9b for forming the sub wavelength structure is formed on the surface of the polysilicon film pattern 63. The recess pattern 9b is formed in consideration of the thermal oxidation process of step (3) described below. Examples of the recess pattern 9b are as indicated in FIGS. 4A through 7C.

(3) A thermal oxidation process is performed to form the infrared ray absorbing film 9 formed with a silicon oxide film on the surface of the polysilicon film pattern 63. At this time, the film thickness at positions of the silicon oxide film 61 that are not covered by the polysilicon film pattern 63 is increased. At the interface between the infrared ray absorbing film 9 and the polysilicon film pattern 63, the sub wavelength structure 9a is formed based on the recess pattern 9b.

(4) The temperature sensor 11 is formed on the infrared ray absorbing film 9 in the same manner as step (3) described above with reference to FIG. 3. Furthermore, the interlayer insulating film 15, the contact holes, the wirings 13, and the protection film 17 are formed in the same manner as step (4) described above with reference to FIG. 3.

(5) By a photoengraving technology and an etching technology, the etching-use opening parts 21 used when removing the polysilicon film pattern 63 are formed in the protection film 17 and the interlayer insulating film 15. The etching-use opening parts 21 reach the polysilicon film pattern 63. The positions where the sensor part 1 is to be formed are demarcated by the etching-use opening parts 21.

(6) This step is described with reference to FIG. 13. By a wet etching technology or an isotropic dry etching technology, the polysilicon film pattern 63 is removed through the etching-use opening parts 21. At this time, the silicon oxide film 61 functions as an etching stop layer. Accordingly, the hollow space 7 is formed between the infrared ray absorbing film 9 and the silicon substrate 5 (on which the silicon oxide film 61 is formed). The sub wavelength structure 9a is exposed in the hollow space 7. The sub wavelength structure 9a is formed with a silicon oxide film, and therefore the etched amount is smaller than that of the polysilicon film pattern 63. Thus, the sub wavelength structure 9a having recesses and protrusions formed in advance appear on the surface of the infrared ray absorbing film 9.

In the etching method performed on the polysilicon film pattern 63, the etching selectivity of silicon and the silicon oxide film is preferably high. If the etching selectivity of the interlayer insulating film 15 or the protection film 17 and the polysilicon film pattern 63 is low, a hard mask (silicon nitride film) for etching protection needs to be formed on the side surfaces of the etching-use opening parts 21 and the surface of the protection film 17.

As described above, in the second aspect of the manufacturing method according to an embodiment of the present invention, a thermal infrared sensor is formed, which has an infrared ray antireflection structure including the sub wavelength structure 9a provided on the surface of the infrared ray absorbing film 9 facing the silicon substrate 5.

The present invention is not limited to the specific embodiments described herein, and variations and modifications may be made without departing from the scope of the present invention.

For example, the above embodiments describe the shape of a single infrared sensor; however, the present invention is also applicable to an infrared line sensor in which infrared sensors are arranged in a one-dimensional array, an infrared two-dimensional array sensor in which infrared sensors are arranged in a two-dimensional array, and an infrared image sensor.

An embodiment of the present invention is applicable to a thermal infrared sensor that receives infrared rays from the back surface of an infrared ray absorbing film.

The following are additional descriptions of embodiments of the present invention.

A thermal infrared sensor according to an embodiment of the present invention includes an infrared ray absorbing film that is thermally separated from a semiconductor substrate by a hollow part; and a temperature sensor configured to detect temperature changes of the infrared ray absorbing film. The infrared ray absorbing film includes an infrared ray antireflection structure configured with a sub wavelength structure, the infrared ray antireflection structure being provided on a surface of the infrared ray absorbing film facing the semiconductor substrate.

A first aspect of a manufacturing method of a thermal infrared sensor according to an embodiment of the present invention is for manufacturing the thermal infrared sensor including an infrared ray absorbing film that is thermally separated from a semiconductor substrate by a hollow part and a temperature sensor configured to detect temperature changes of the infrared ray absorbing film. The manufacturing method includes steps (A) through (E), which are performed in the order stated below.

(A) A step of forming, by a photoengraving technology and an etching technology, a recess pattern used for forming a sub wavelength structure, the recess pattern being formed on a surface of the semiconductor substrate at a position where a sensor unit including the temperature sensor of the thermal infrared sensor is to be formed.

(B) A step of forming, by a thermal oxidation process, the infrared ray absorbing film on the surface of the semiconductor substrate, the infrared ray absorbing film configured with a silicon oxide film having the sub wavelength structure that is formed based on the recess pattern.

(C) A step of forming the temperature sensor on the infrared ray absorbing film.

(D) A step of forming an interlayer insulating film, wirings, and a protection film to obtain an electric potential of the temperature sensor.

(E) A step of forming, by the photoengraving technology and the etching technology, an etching-use opening part in the protection film and the interlayer insulating film so that the etching-use opening part reaches the semiconductor substrate, the etching-use opening part being used for removing a part of the semiconductor substrate immediately below the infrared ray absorbing film, and subsequently forming, by a wet etching technology, the hollow part between the infrared ray absorbing film and the semiconductor substrate, the hollow part being formed by removing the part of the semiconductor substrate immediately below the infrared ray absorbing film through the etching-use opening part.

A second aspect of a manufacturing method of a thermal infrared sensor according to an embodiment of the present invention is for manufacturing the thermal infrared sensor including an infrared ray absorbing film that is thermally separated from a semiconductor substrate by a hollow part and a temperature sensor configured to detect temperature changes of the infrared ray absorbing film. The manufacturing method includes steps (A) through (E), which are performed in the order stated below.

(A) A step of forming a semiconductor layer on the semiconductor substrate via an insulating film, and forming, by a photoengraving technology and an etching technology, a recess pattern used for forming a sub wavelength structure, the recess pattern being formed on a surface of the semiconductor layer at a position where a sensor unit including the temperature sensor of the thermal infrared sensor is to be formed.

(B) A step of forming, by a thermal oxidation process, the infrared ray absorbing film on the surface of the semiconductor layer, the infrared ray absorbing film configured with a silicon oxide film having the sub wavelength structure that is formed based on the recess pattern.

(C) A step of forming the temperature sensor on the infrared ray absorbing film.

(D) A step of forming an interlayer insulating film, wirings, and a protection film to obtain an electric potential of the temperature sensor.

(E) A step of forming, by the photoengraving technology and the etching technology, an etching-use opening part in the protection film and the interlayer insulating film so that the etching-use opening part reaches the semiconductor layer, the etching-use opening part being used for removing a part of the semiconductor layer immediately below the infrared ray absorbing film; and subsequently forming, by a wet etching technology, the hollow part between the infrared ray absorbing film and the semiconductor substrate, the hollow part being formed by removing the part of the semiconductor layer immediately below the infrared ray absorbing film through the etching-use opening part.

A thermal infrared sensor according to an embodiment of the present invention includes an infrared ray antireflection structure configured with a sub wavelength structure, provided on a surface of an infrared ray absorbing film facing a semiconductor substrate. The first and second aspects of the manufacturing method according to embodiments of the present invention are for forming a thermal infrared sensor including an infrared ray antireflection structure configured with a sub wavelength structure, provided on a surface of an infrared ray absorbing film facing a semiconductor substrate.

A description is given of the sub wavelength structure. A periodic lattice, which is achieved by forming the sub wavelength structure (a structure having shorter periods than the wavelengths of light beams to be used) on the surface of an optical element, does not generate diffracted waves. However, the structure of the periodic lattice significantly affects transmission properties and reflection properties of optical waves.

The periodic lattice of the sub wavelength structure is substantially equivalent to a medium having a refractive index which is an average of a base material of an optical element and surrounding media, with respect to optical waves. The average refractive index generated by the aforementioned effect is hereinafter referred to as an effective refractive index. That is to say, when the sub wavelength structure is not provided, the variation of the refractive index is sharp at an interface between the optical element and surrounding media. Meanwhile, when the sub wavelength structure is provided, the variation of the refractive index is gradual at an interface between the optical element and surrounding media, and therefore antireflection effects can be achieved. In this manner, by appropriately designing the sub wavelength structure, an antireflection structure can be formed.

Non-patent document 2 discloses an antireflection structure including recesses and protrusions that are arranged two-dimensionally.

Non-patent document 2: Journal of Optical Society of America, A, Vol. 12, no. 2, pp. 333-339, 1995

Figure 16:
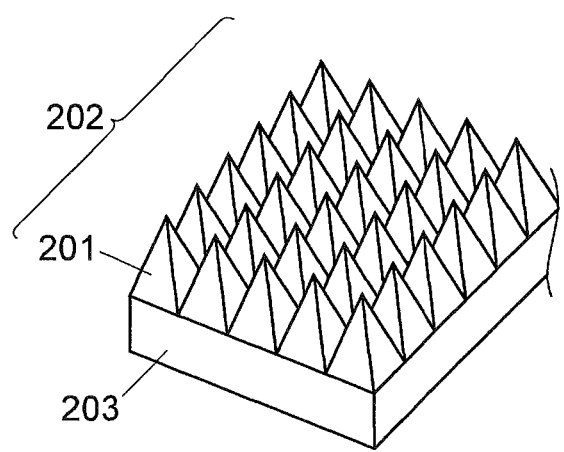
FIG. 16 is a schematic perspective view for describing an antireflection structure in which recesses and protrusions are arranged two-dimensionally.

As shown in FIG. 16, a period structure 202 of a sub wavelength is formed by arranging recesses and protrusions 201 that are square pyramids on a surface of a member 203. Accordingly, the period structure 202 is equivalent to a thin film layer having an effective refractive index that is a median of the member 203 on which the recesses and protrusions 201 are formed and the surrounding media. Thus, reflections on this surface are reduced.

Furthermore, non-patent document 1 indicates that an antireflection effect with respect to infrared rays can also be achieved with the sub wavelength structure. Furthermore, the recesses and protrusions of the sub wavelength structure formed on an element surface are not limited to pyramid shapes; an antireflection effect can also be achieved with pillar-shaped recesses and protrusions.

As described above, by forming a sub wavelength structure on the surface of an element, light beams entering the element can be prevented from reflecting. In the thermal infrared sensor and the manufacturing method thereof according to an embodiment of the present invention, the infrared ray antireflection structure configured with a sub wavelength structure is formed on the surface of the infrared ray absorbing film facing the semiconductor substrate. Therefore, in a thermal infrared sensor that receives infrared rays from the back surface of the infrared ray absorbing film, it is possible to reduce the reflection ratio of infrared rays at the back surface of the infrared ray absorbing film, and the sensitivity of the thermal infrared sensor can be increased.

In the thermal infrared sensor according to an embodiment of the present invention, the semiconductor substrate is an SOI substrate, the infrared ray absorbing film is formed with a BOX layer of the SOI substrate, and the temperature sensor is formed on a single crystal silicon layer of the SOI substrate. In the first aspect of a manufacturing method according to an embodiment of the present invention, the semiconductor substrate is a supporting substrate of an SOI substrate, the thermal oxidation process at step (B) is also performed for forming a BOX layer of the SOI substrate on a surface of the supporting substrate, the manufacturing method further includes a step (B') of flattening a surface of the BOX layer by a polishing process and adhering the single crystal silicon layer onto the BOX layer to form an active layer of the SOI substrate, step (B') being performed between step (B) and step (C), and step (C) includes forming the temperature sensor on the single crystal silicon layer formed at step (B').

However, in the thermal infrared sensor and the manufacturing method thereof according to an embodiment of the present invention, the semiconductor substrate is not limited to an SOI substrate; the semiconductor substrate may be a bulk semiconductor substrate.

Furthermore, in the thermal infrared sensor according to an embodiment of the present invention, the infrared ray absorbing film is not limited to being configured with a BOX layer; the infrared ray absorbing film may be any kind of film as long as the temperature of the film changes by absorbing infrared rays, such as a silicon oxide film, a silicon nitride film, and a laminated film including a silicon nitride film and a silicon oxide film.

In the thermal infrared sensor and the manufacturing method thereof according to an embodiment of the present invention, the temperature sensor is not limited to being formed on the single crystal silicon film; the temperature sensor may be any kind of sensor as long as it can detect temperature changes in the infrared ray absorbing film, such as a PN diode, a MOSFET, a thermistor, a bolometer, a thermopile, and a pyroelectric element.

In the thermal infrared sensor according to an embodiment of the present invention, a CMOS (Complementary Metal Oxide Semiconductor) circuit may be further provided on the semiconductor substrate.

In consideration of making the thermal infrared sensor and the CMOS circuit monolithic, part of the thermal infrared sensor and the CMOS circuit need to be formed simultaneously. Thus, it is not preferable to form an antireflection film at a layer under the infrared sensor part, with a material other than a material that is used in a typical CMOS process. Furthermore, in an infrared sensor having such a configuration, a silicon oxide film and a silicon nitride film are often used as the infrared ray absorbing film. Materials for forming an antireflection film that is effective on such materials (used for forming the infrared ray absorbing film) are not included among materials that are used in a typical CMOS process.

The thermal infrared sensor according to an embodiment of the present invention includes an infrared ray antireflection structure configured with a sub wavelength structure provided on a surface of the infrared ray absorbing film facing the semiconductor substrate. Thus, there is no need to form an antireflection film on the back surface of the infrared ray absorbing film (the surface facing the semiconductor substrate) with a material other than materials used in a CMOS process. Accordingly, the CMOS circuit can easily be made monolithic.

The thermal infrared sensor according to an embodiment of the present invention includes an infrared ray antireflection structure configured with a sub wavelength structure provided on a surface of the infrared ray absorbing film facing the semiconductor substrate. The first and second aspects of the manufacturing method according to an embodiment of the present invention are for forming a thermal infrared sensor including an infrared ray antireflection structure configured with a sub wavelength structure provided on a surface of the infrared ray absorbing film facing the semiconductor substrate. Thus, in a thermal infrared sensor for receiving infrared rays from the back surface of the infrared ray absorbing film, the reflection ratio of infrared rays can be reduced at the back surface of an infrared ray absorbing film, and the sensitivity of the thermal infrared sensor can be increased.

In the thermal infrared sensor according to an embodiment of the present invention, the semiconductor substrate may be an SOI substrate, the infrared ray absorbing film may be formed with a BOX layer of the SOI substrate, and the temperature sensor may be formed on a single crystal silicon layer of the SOI substrate.

Furthermore, in the first aspect of a manufacturing method according to an embodiment of the present invention, the semiconductor substrate may be a supporting substrate of an SOI substrate, the thermal oxidation process at step (B) may also be performed for forming a BOX layer of the SOI substrate on a surface of the supporting substrate, the manufacturing method may further include a step (B') of flattening a surface of the BOX layer by a polishing process and adhering the single crystal silicon layer onto the BOX layer to form an active layer of the SOI substrate, step (B') being performed between step (B) and step (C), and step (C) may include forming the temperature sensor on the single crystal silicon layer formed at step (B').

Accordingly, compared to the case of forming the temperature sensor on polysilicon, the S/N ratio (ratio of the amount of signals and the amount of noise) of the thermal infrared sensor can be improved, and stability and uniformity can be enhanced.

The thermal infrared sensor according to an embodiment of the present invention includes an infrared ray antireflection structure configured with a sub wavelength structure provided on a surface of the infrared ray absorbing film facing the semiconductor substrate. Thus, there is no need to form an antireflection film on the back surface of the infrared ray absorbing film with a material other than materials used in a CMOS process. Accordingly, the CMOS circuit can easily be made monolithic.

The present application is based on Japanese Priority Patent Application No. 2010-204413, filed on Sep. 13, 2010, the entire contents of which are hereby incorporated herein by reference.

What is claimed is:

1. A thermal infrared sensor comprising:
a sensor part including an infrared ray absorbing film that is separated from a semiconductor substrate by a hollow part;
a temperature sensor configured to detect temperature changes of the infrared ray absorbing film; and
wirings coupled to the temperature sensor, for obtaining electric potential of the temperature sensor, wherein
the infrared ray absorbing film of the sensor part includes an infrared ray antireflection structure configured with a sub wavelength structure separated from the semiconductor substrate by the hollow part, the infrared ray antireflection structure being provided in direct contact with a surface of the infrared ray absorbing film of the sensor part facing the semiconductor substrate, and wherein
infrared rays enter from a surface of the semiconductor substrate which is on a side of the semiconductor substrate on which the wirings are not formed.

2. The thermal infrared sensor according to claim 1, wherein
the semiconductor substrate is a silicon-on insulator (SOI) substrate,
the infrared ray absorbing film is formed with a buried oxide (BOX) layer of the SOI substrate, and
the temperature sensor is formed on a single crystal silicon layer of the SOI substrate.

3. The thermal infrared sensor according to claim 1, further comprising:
a complementary metal oxide semiconductor (CMOS) circuit provided on the semiconductor substrate.

4. The thermal infrared sensor according to claim 1, wherein the infrared ray absorbing film is thermally separated from the semiconductor substrate.

5. A manufacturing method of a thermal infrared sensor comprising a sensor part including an infrared ray absorbing film that is separated from a semiconductor substrate by a hollow part and a temperature sensor configured to detect temperature changes of the infrared ray absorbing film, the manufacturing method comprising:
forming a recess pattern used for forming a sub wavelength structure, the recess pattern being formed on a surface of the semiconductor substrate at a position where a sensor unit including the temperature sensor of the thermal infrared sensor is to be formed;
forming, by a thermal oxidation process, the infrared ray absorbing film on the surface of the semiconductor substrate, in which the infrared ray absorbing film configured with a silicon oxide film is laminated on the sub wavelength structure, and on one side of the infrared ray absorbing film, the sub wavelength structure that is formed based on the recess pattern is formed;
forming the temperature sensor on the infrared ray absorbing film, and forming an interlayer insulating film, wirings and a protection film, to obtain an electric potential of the temperature sensor;
forming, by the etching technology, an etching-use opening part in the protection film and the interlayer insulating film so that the etching-use opening part reaches the semiconductor substrate, the etching-use opening part being used for removing a part of the semiconductor substrate immediately below the infrared ray absorbing film; and
forming the hollow part between the infrared ray absorbing film and the semiconductor substrate, the hollow part being formed by removing the part of the semiconductor substrate immediately below the infrared ray absorbing film through the etching-use opening part, and the sub wavelength structure of the infrared ray absorbing film is exposed toward the hollow part,
wherein the infrared ray absorbing film of the sensor part in the thermal infrared sensor manufactured by said manufacturing method includes an infrared ray antireflection structure configured with the sub wavelength structure separated from the semiconductor substrate by the hollow part, the infrared ray antireflection structure being provided in direct contact with a surface of the infrared ray absorbing film of the sensor part facing the semiconductor substrate.

6. The manufacturing method according to claim 5, wherein
the semiconductor substrate is a supporting substrate of an SOI substrate,
the thermal oxidation process for forming the infrared ray absorbing film is also performed for forming a BOX layer of the SOI substrate on a surface of the supporting substrate,
the manufacturing method further includes forming a single crystal silicon layer of the SOI substrate by flattening a surface of the BOX layer by a polishing process and adhering the single crystal silicon layer onto the BOX layer, the forming of the single crystal silicon layer being performed between the forming of the infrared ray absorbing film and the forming of the temperature sensor, and
the forming of the temperature sensor includes forming the temperature sensor on the single crystal silicon layer.

7. The manufacturing method according to claim 5, wherein the infrared ray absorbing film is thermally separated from the semiconductor substrate.

8. A manufacturing method of a thermal infrared sensor comprising a sensor part including an infrared ray absorbing film that is separated from a semiconductor substrate by a hollow part and a temperature sensor configured to detect temperature changes of the infrared ray absorbing film, the manufacturing method comprising:

forming a semiconductor layer on the semiconductor substrate via an insulating film;

forming a recess pattern used for forming a sub wavelength structure, the recess pattern being formed on a surface of the semiconductor layer at a position where a sensor unit including the temperature sensor of the thermal infrared sensor is to be formed;

forming, by a thermal oxidation process, the infrared ray absorbing film on the surface of the semiconductor layer, the infrared ray absorbing film configured with a silicon oxide film is laminated on the sub wavelength structure, and on one side of the infrared ray absorbing film, the sub wavelength structure that is formed based on the recess pattern is formed;

forming the temperature sensor on the infrared ray absorbing film, and forming an interlayer insulating film, wirings and a protection film to obtain an electric potential of the temperature sensor;

forming, by the etching technology, an etching-use opening part in the protection film and the interlayer insulating film so that the etching-use opening part reaches the semiconductor layer, the etching-use opening part being used for removing a part of the semiconductor layer immediately below the infrared ray absorbing film; and forming the hollow part between the infrared ray absorbing film and the semiconductor substrate, the hollow part being formed by removing the part of the semiconductor layer immediately below the infrared ray absorbing film through the etching-use opening part, and the sub wavelength structure of the infrared ray absorbing film is exposed toward the hollow part, wherein the infrared ray absorbing film of the sensor part in the thermal infrared sensor manufactured by said manufacturing method includes an infrared ray antireflection structure configured with the sub wavelength structure separated from the semiconductor substrate by the hollow part, the infrared ray antireflection structure being provided in direct contact with a surface of the infrared ray absorbing film of the sensor part facing the semiconductor substrate.

9. The manufacturing method according to claim 8, wherein the infrared ray absorbing film is thermally separated from the semiconductor substrate.

* * * * *